Jan. 19, 1932.  S. HERSHBERG  1,841,811
CAMERA DEVICE
Filed May 9, 1928  5 Sheets-Sheet 5
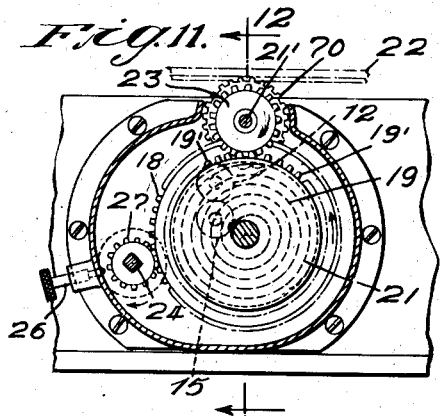
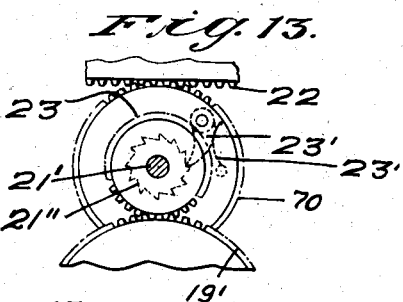
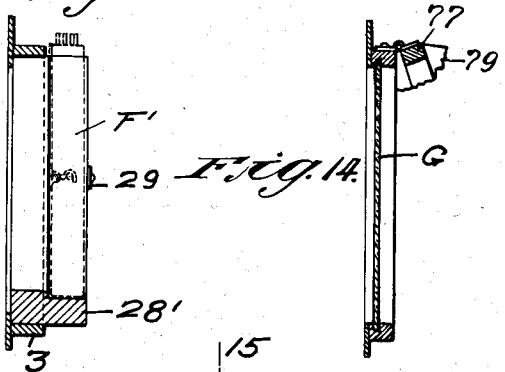
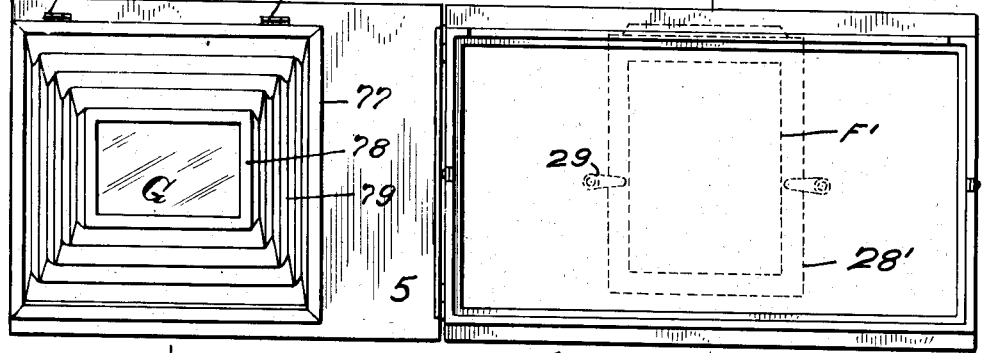
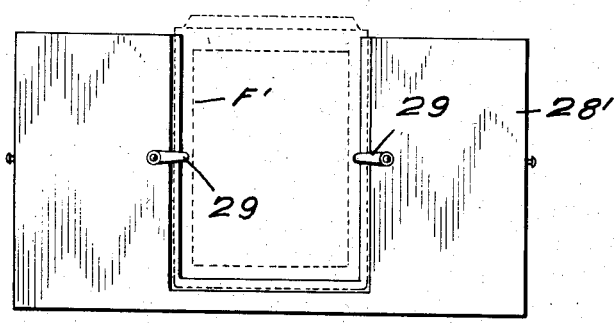
Samuel Hershberg
INVENTOR
BY Mock & Blum
ATTORNEYS Patented Jan. 19, 1932

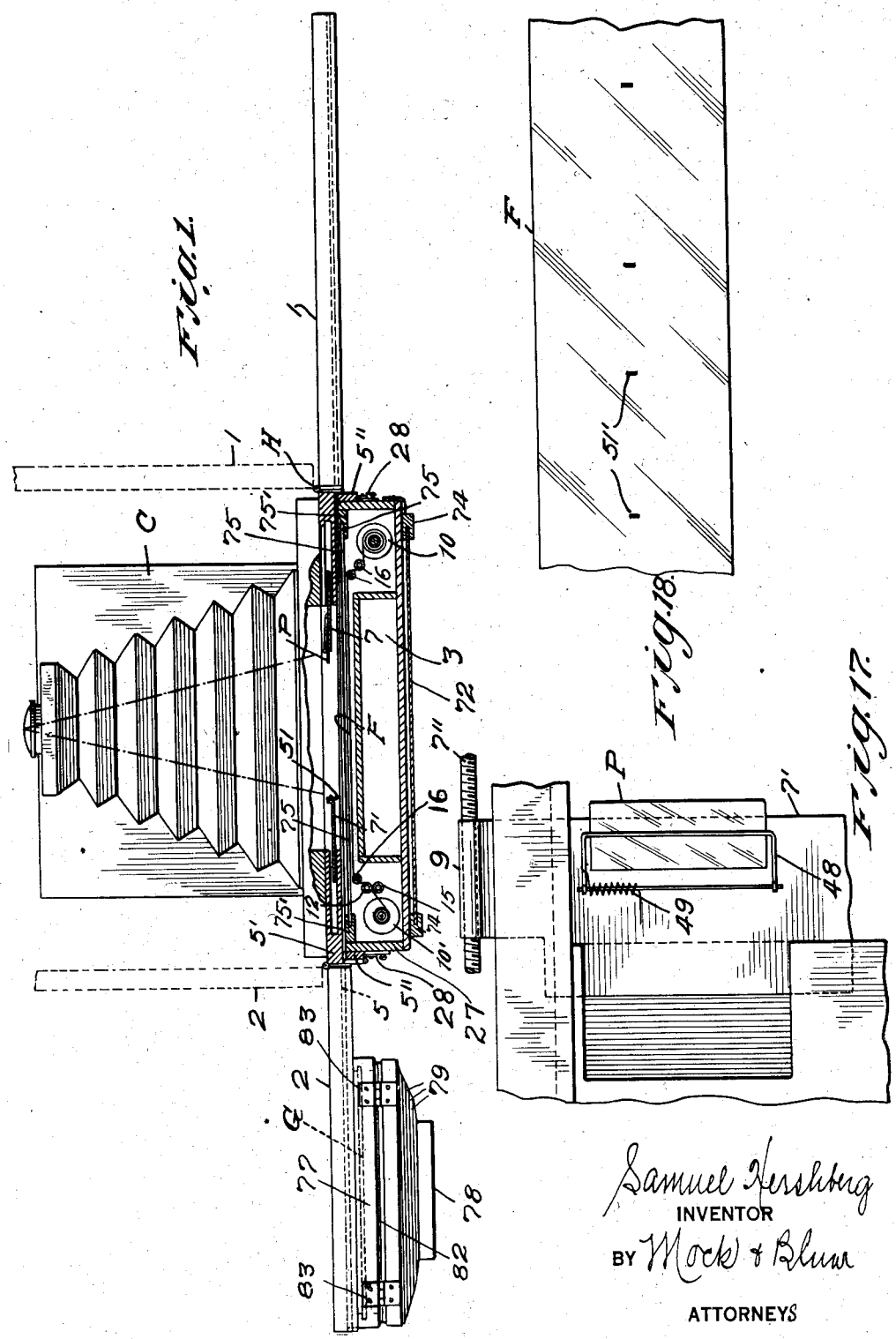

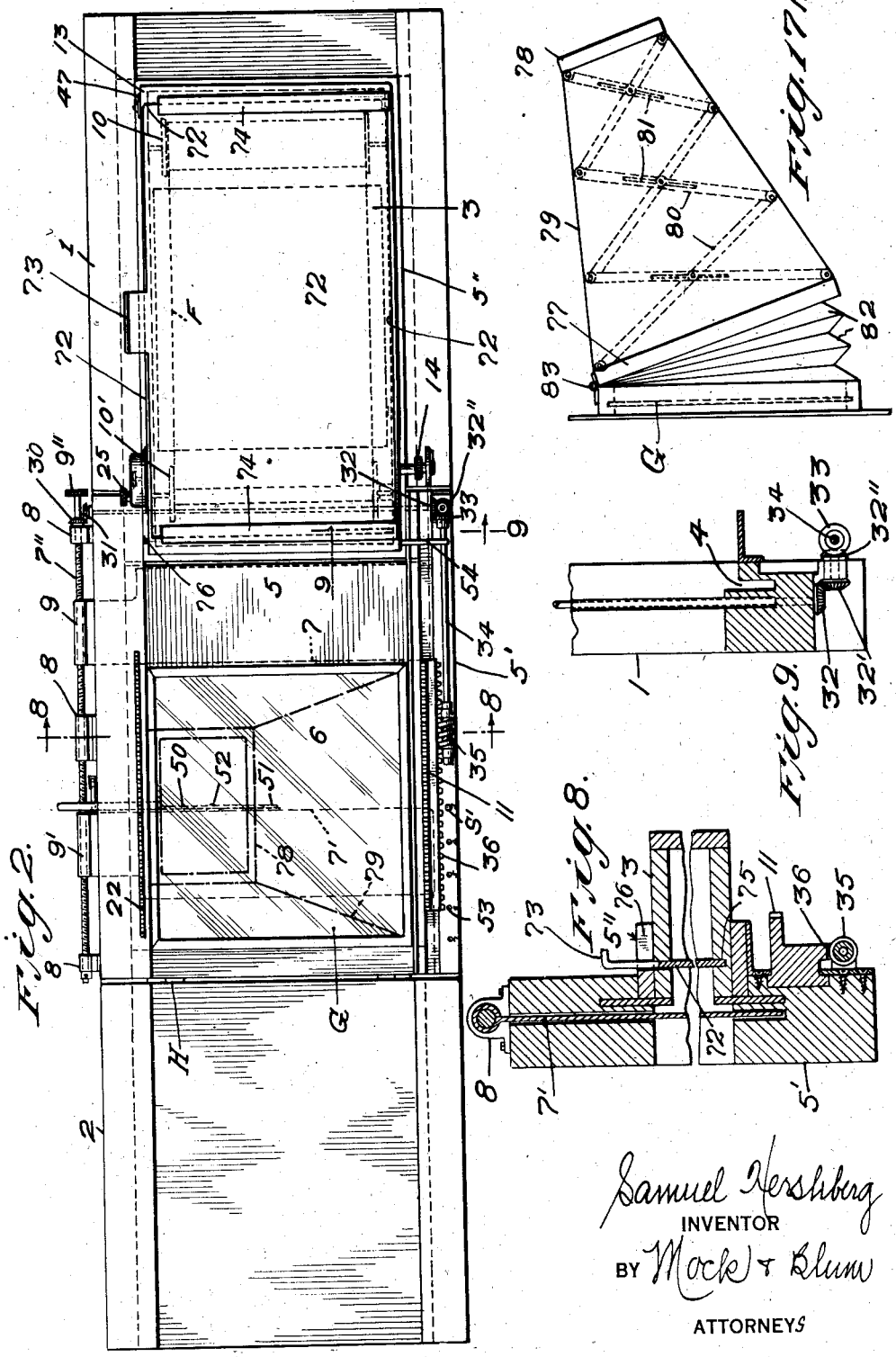

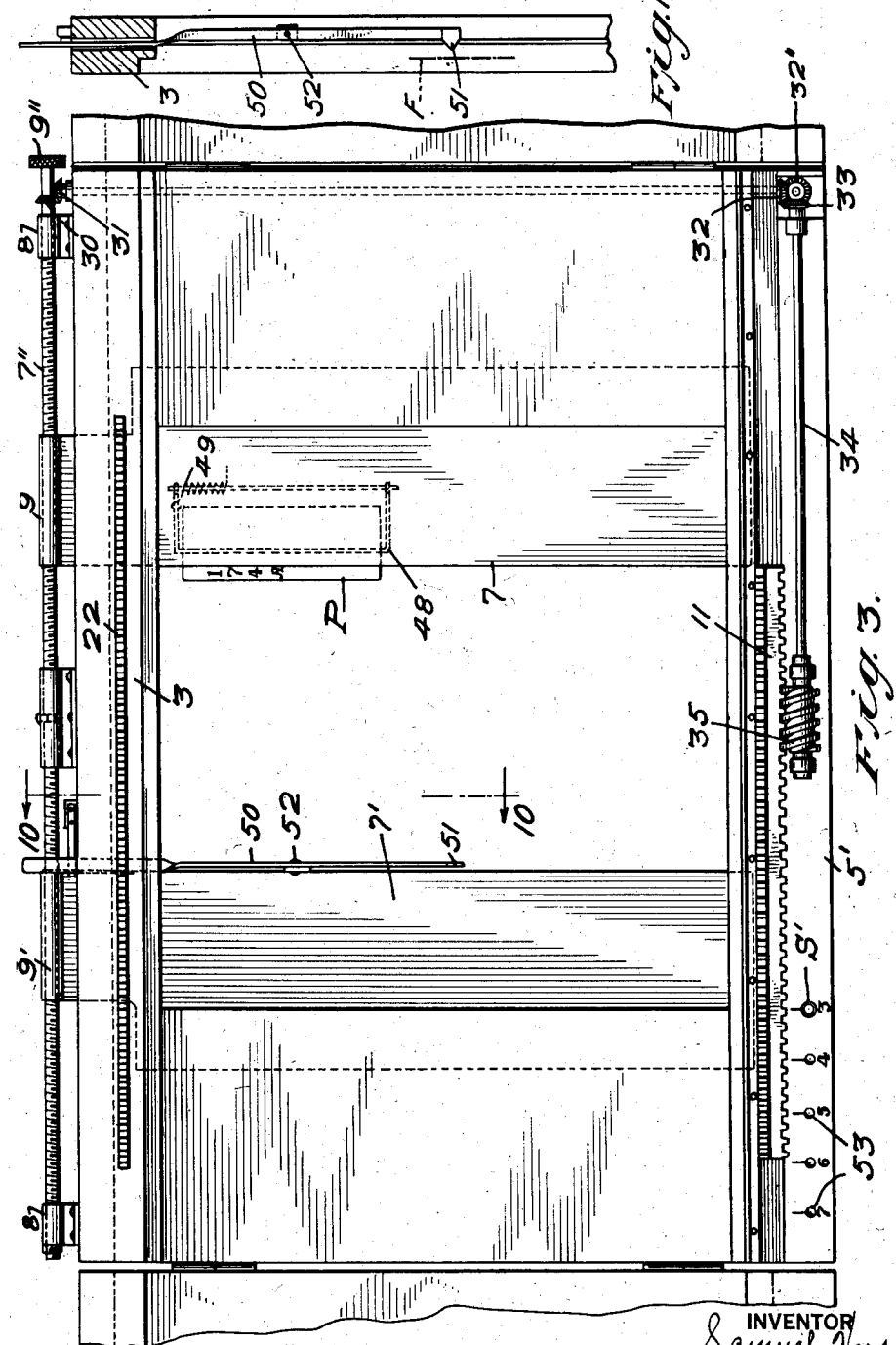

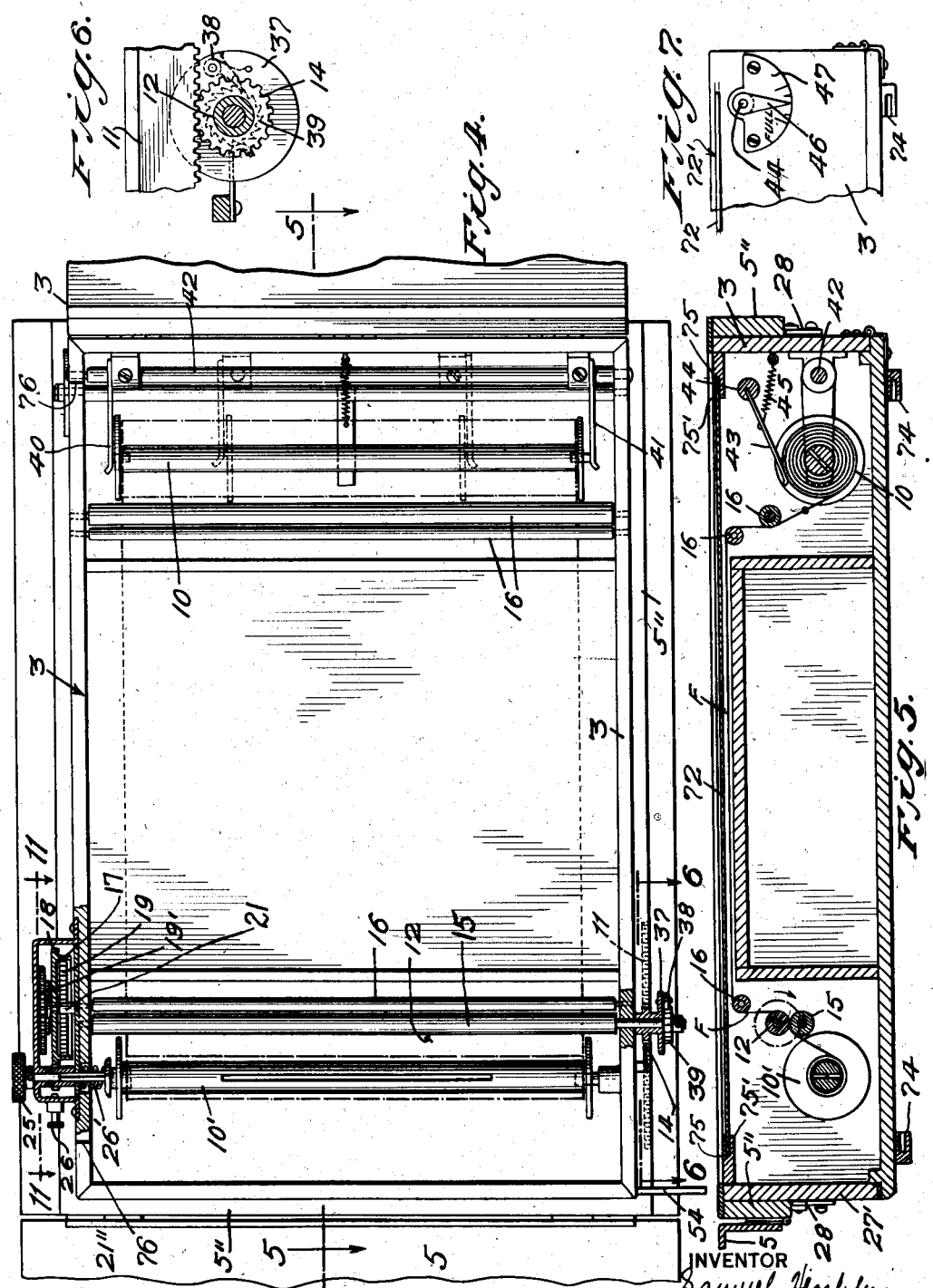

1,841,811

UNITED STATES PATENT OFFICE

SAMUEL HERSHBERG, OF BROOKLYN, NEW YORK

CAMERA DEVICE

Application filed May 9, 1928. Serial No. 276,248.

My invention relates to a new and improved camera device.

One of the objects of my invention is to provide a camera device in which the film (either in the form of a roll or of a film pack) is located within a casing slidably mounted with respect to the camera.

Another object of my invention is to provide a camera device by means of which the ground glass used for focussing shall be also slidably connected to the camera, so that it can be moved simultaneously with the film.

Another object of my invention is to provide a device whereby the said ground glass and the film can be simultaneously moved laterally with respect to the camera, so that the portion of the film to be exposed can be slid to occupy the exact position previously occupied by the ground glass, whereby prompt accurate focussing on the film is provided.

Another object of my invention is to provide a camera device whereby the sliding movement of the film casing with respect to the camera shall automatically cause the feed of a proper length of the film, from a roll of the said film.

Another object of my invention is to provide a camera device having shutters which can be regulated to adjust the width of the exposed film.

Another object of my invention is to automatically regulate the feed of the film (from a roll thereof) so that this shall correspond to the adjustment of the shutters.

Another object of my invention is to provide simple and convenient means for photographing on the exposed plate or film any suitable data, such as the date and any other record.

Another object of my invention is to provide mechanism whereby the sliding movement of the film casing shall automatically produce tension upon the take-up roller for a roll of film.

Another object of my invention is to provide mechanism for indicating the respective exposed surfaces of a roll of film, in order to facilitate developing and the like.

Other objects of my invention will be set forth in the following description and drawings which illustrate preferred embodiments thereof, it being understood that the above general statement of my invention is intended merely to generally explain the same and not to limit it in any manner.

Fig. 1 is a top view partially in section, showing the camera and the attachment.

Fig. 2 is a rear elevation of Fig. 1 showing the slidable carriage or frame on which the film holder and the ground glass are mounted.

Fig. 3 is an enlarged detail view of a part of the device shown in Fig. 2.

Fig. 3A shows the said slidable carriage or frame, in combination with a film casing adapted to hold a film pack.

Fig. 4 is an enlarged rear view partially in section showing the film casing and the mechanism for feeding the roll of film.

Fig. 5 is a sectional view on the line 5—5 of Fig. 4.

Fig. 6 is a detail view of part of the mechanism for feeding the roll of film.

Fig. 7 is a detail view showing the indicator used in connection with a roll of film.

Fig. 8 is a sectional view on the line 8—8 of Fig. 2.

Fig. 9 is a sectional view on the line 9—9 of Fig. 2.

Fig. 10 is a sectional view on the line 10—10 of Fig. 3.

Fig. 11 is a sectional view on the line 11—11 of Fig. 4.

Fig. 12 is a sectional view on the line 12—12 of Fig. 11.

Fig. 13 is a sectional view on the line 13—13 of Fig. 12.

Fig. 14 is a sectional view on the line 14—14 of Fig. 3A.

Fig. 15 is a sectional view on the line 15—15 of Fig. 3A.

Fig. 16 is an elevation of the holder used for holding film pack or a plate.

Fig. 17 is a detail view of the holder for the recording card.

Fig. 17A shows a side elevation of the improved hood used in combination with the ground glass.

Fig. 18 shows a detail view of the film having the division marks or perforations therein.

The camera C can be of any ordinary type. A frame 5' can be suitably located at the rear of the camera, or it can form part of the rear of the camera. The frame 5' is provided with guide arms 1 and 2 connected thereto by hinges H so that the said guide arms 1 and 2 can be moved to the dotted line position indicated in Fig. 1 for convenience in packing, shipping, etc. Likewise the said guide arms 1 and 2 can be moved to the outer position indicated in full lines in Fig. 1. Any suitable spring detents or latches can be utilized for holding the guide arms 1 and 2 in the outer operative position shown in Fig. 1.

A slidable frame or carriage 5 is provided at the rear of the frame 5' and the film casing 3 is mounted upon this slidable carriage 5. The said frame 5' and the guide arms 1 and 2 are provided with suitable grooves or recesses 4 at their tops and bottoms and the film casing 3 is provided with suitable projecting metal strips which can slide in these grooves 4. The frame for the ground glass G is also mounted upon the slidable frame 5. As shown in Fig. 14 for example, the frame for the ground glass G is also provided with metal strips which slide in said guide grooves in the arm 2.

I prefer to have the photographic film or plate in the casing 3, parallel to and in the same plane with the ground glass G so that if a proper focus has been secured upon the ground glass G, the carriage 5 can be slid to the left, thus bringing the exposed portion of the film F into proper position.

In order to regulate the width of the photographic film or plate which is to be exposed, the frame 5' is provided with laterally movable shutters 7 and 7' which are made of suitable opaque material.

As shown in Fig. 2, a screw 7" is mounted at the top of the carriage 5 in suitable bearings 8, and the screw can be turned by means of its knurled head 9". The screw 7" also passes through the internally threaded sleeves 9 and 9' which are respectively connected to the shutters 7 and 7'. The sleeves 9 and 9' are oppositely threaded, so that they will be moved in opposite directions when the screw 7" is operated.

The casing 3 may contain an ordinary photographic plate, a film packing, or a roll of film.

If a roll of film is utilized, this is mounted upon a magazine roller 10 which is of the ordinary type. According to my invention the film is automatically withdrawn from the roller 10 as the film casing 3 is pushed to the exposure opening between the shutters 7 and 7'.

For this purpose the frame 5' is provided with a laterally adjustable rack 11. The film F passes over suitable idler rollers and it then passes between friction feed rollers 12 and 15, to the take-up roller 10', which is of the ordinary type. The shaft of the inner feed roller 12 is provided with a sleeve upon which a disc 37 is freely mounted so that the said disc 37 can turn with respect to said shaft. This sleeve is provided with a pinion 14 so that when the carriage 5 is slid to the left, the pinion 14 will mesh with rack 11 and will be caused to turn in the counterclockwise direction. The disc 37 is provided with a pawl 38 which cooperates with a ratchet 39, fixed to the end of the shaft of the feed roller 12. Hence when the carriage 5 is slid to the left, the pawl 38 engages the ratchet 39 to positively turn the feed roller 12. This simultaneously causes the actuation of the feed roller 15 because the said feed rollers 12 and 15 are forced towards each other for this purpose, so that the film F is positively fed towards the take-up roller 10'. Upon the return movement of the carriage 5, that is, when the carriage 5 is moved to the right, the movement of the pinion 14 upon the rack 11 causes the disc 37 to turn in the reverse direction so that the pawl 38 slips over the ratchet 39 without moving the film.

The take-up roller 10' is turned under suitable tension so as to take up the film F which is fed thereto.

As shown more specifically in Figs. 4, 11—13 inclusive, a spring barrel 17 is mounted upon a shaft 21 which is connected to a spiral spring 19, the outer end of which is connected to the said spring barrel 17. The shaft 21 is provided with a gear 19' which meshes with a gear 23 mounted on a shaft 21'. Said shaft 21' has a gear 70 which meshes with a rack 22 which is secured to the frame 5'. The gear 70 can turn freely with respect to shaft 21', and it is provided with a pawl 23' which meshes with a ratchet 23" secured to shaft 21'. Hence when the carriage 5 is moved to the left, the shaft 21 is turned to wind up the spiral spring 19, which correspondingly urges the spring barrel 17 in the proper direction. The reverse movement of the carriage does not cause the shaft 21 to turn in the reverse direction. The spring barrel 17 has an external gear 18 and this meshes with the corresponding gear 27 secured to a sleeve mounted upon the adjacent square end 24 of the shaft of the roller 10'. The bore of the said sleeve is also square so that it turns in unison wth the take-up roller 10'.

In order to remove the take-up roller 10' together with the exposed and wound-up film, the square shaft 24 is pulled out of its bearing or sleeve by means of the head 25 thereof.

In order to prevent the movement of the gear 18 when the square shaft 24 is pulled out of the casing 3, a lock pin 26 is provided which locks with a gear 27, which meshes with the said gear 18. A spiral spring 26' is provided to prevent the take-up roller 10' from laterally shifting with respect to the member 24.

The said member 24 fits within a corresponding square opening of the take-up roller 10'.

The parts for actuating the roll of film are mounted in a frame 27 which fits within the casing 3, and is held within the casing 3 by means of latches 28.

If it is desired to utilize film packs instead of a roll of film, the frame 27 can be removed and it can be replaced by a spacing block 28' having an opening in which the film pack F' is held by means of clips 29.

In order to adjust the rack 11 on the frame 5', the screw 7" is provided with a bevel gear 30 which meshes with a bevel gear 31 upon a shaft having another bevel gear 32 which is connected by means of intermediate bevel gears 32' and 32" to a bevel gear 33, located upon a shaft 34 having a worm 35. The teeth of the worm 35 mesh with the teeth 36 which form part of the rack 11. Hence when the shutters 7 and 7' are adjusted, the rack 11 is simultaneously moved so as to regulate the extent to which the gear 14 will be actuated by the movement of the carriage 5. If the shutters 7 and 7' are moved towards each other so as to present a relatively narrow exposure opening, the rack 11 is shifted to the left so that a smaller portion of film is unwound from the magazine roller 10.

As shown in Fig. 3 a series of perforations 53 are provided in the frame 5', each of them being designated by a number corresponding to the width of the film which is to be fed forwardly. If a stop S' is placed in one of these holes, this abuts a stop 54 on the casing 3 so that the movement of the carriage 5 to the left, is thus limited. For example, when the stop S' is located in the opening marked "3", the width of the film which is fed forwardly by the mechanism previously described, is three inches.

In order to permit the device to be used with films of different widths, the magazine roller 10 is mounted in bearings held in adjustable arms 40 and 41 which are slidably mounted upon an arm 42 so that said adjustable arms 40 and 41 can be held in various fixed positions on said arm 42. The different positions of members 40 and 41 are illustrated in Fig. 4.

In order to indicate when the film is exhausted, a member 43 is pivotally mounted at 44 so that it bears upon the wound-up film on the magazine roller 10. A tension spring 45 presses the finger 43 against the film.

The shaft 44 bears an outer indicator 46 which cooperates with the scale 47.

In order to photographically print any suitable data upon an exposed film, the apparatus shown in Fig. 3 is provided. For example, the shutter 7 is provided with a clip 48 pivotally connected thereto and provided with a torsion spring 49 which forces the clip against the said shutter 7. Hence, a piece of paper P having any suitable markings can be clamped into position as shown in Fig. 3. The piece of paper P is preferably transparent and has the markings indicated thereon in black ink. The markings on the paper P can be either printed or written and they are photographed upon the film so as to indicate the date or the like.

In order to conveniently indicate the width of each exposed section of the film, a rod 50 is pivotally connected at 52 to the shutter 7'. The rod 50 is provided with a point 51. By rocking the arm 50 the point 51 is caused to make a mark 51' on the film adjacent the inner edge of the shutter 7'. This serves to conveniently indicate each film section when it is necessary to develop the same.

After all the film within the casing 3 has been utilized it is necessary to close the inner end of the frame 27 before removing it for the purpose of developing the film. For this purpose the frame 27 is provided with grooved extensions 75' into which a panel 72 can be inserted so as to close the frame 27. The frame 27 is provided with grooved projections 74 at the exterior thereof, in which the panel or shutter 72 can be conveniently mounted.

As shown in Figs. 1 and 17A an improved hood 79 is provided in combination with the frame for the ground glass. This hood comprises frame members 77 and 78 which are connected to each other by links 79 so that the hood can be readily extended or collapsed. The frame member 77 is secured to the frame for the ground glass G, by means of a hinge 83. In order to permit the hood 79 to be tilted to any convenient angle, a pleated member 82 is provided intermediate the frame for the ground glass and the frame member 77 of the hood 79.

As shown in Fig. 8, the panel 72 is provided with a bent end 73, by means of which it can be conveniently manipulated.

While I have shown the various parts of the device as being conveniently located to a detachable frame which is adapted to be located at the rear of a camera, I do not wish to be limited to the use of such a frame.

Likewise the said frame may be made integral with the camera. Although I have described certain specific mechanical parts for producing the novel movements herein described, I do not wish to be limited to the use of such mechanical parts as numerous changes and omissions could be made from the preferred embodiment described herein without departing from the spirit of my invention.

I claim.

1. A camera attachment comprising a frame, and a slidable carriage mounted in said frame, said slidable carriage having a focussing glass and also having a film support mounted thereon, said focussing glass and said film being in the same plane and said carriage being slidable in a direction parallel to said plane so that the focussing glass can be first held in proper position for focussing and the carriage can then be slid to bring a suitable portion of the film in proper position for exposure.

2. A camera attachment comprising a frame located at the rear of a camera, a slidable carriage located in said frame and having a roll of film located thereon, co-acting feeding means for the said film located respectively on the said frame and on the said carriage so that the sliding movement of the said carriage with respect to said frame causes the film to be fed and means associated with said frame and adapted to regulate the sliding movement of said carriage so as to regulate the feed of the film.

3. A device according to claim 2 in which the said regulating means comprise a stop on the carriage and an adjustable co-acting stop adapted to be located in a plurality of different positions on the frame.

4. In a camera attachment the sub-combination of a frame located at the rear of a camera, said frame having a pair of arms hinged thereto, and a slidable carriage mounted upon the said frame and adapted to slide therein and to also slide in the said arms when said arms are parallel to said frame, the said carriage having a ground glass and a film support mounted thereon.

5. In a camera attachment, the combination of a frame located at the rear of a camera, a slidable carriage located in said frame and having a roll of film located thereon, co-acting feeding means for the said film located respectively on the said frame and on the said carriage so that the sliding movement of the said carriage with respect to said frame causes the film to be fed, a pair of adjustable shutters located in the said frame and adapted to limit the field of exposure, and means adapted to simultaneously adjust said shutters and to regulate the action of the said feeding means so that the length of film which is taken off the roll at each stroke of the carriage corresponds to the distance between the adjacent ends of the shutters.

6. In a camera attachment the combination of a frame having a slidable carriage mounted thereon, a rack located on the said frame, film feeding means mounted on the said carriage and including a feed roller having a gear freely mounted upon the shaft thereof, said gear being adapted to mesh with the said rack so that said gear is turned by the sliding movement of the said carriage, a ratchet secured to the shaft of the said feed roller and a pawl connected to the said gear and adapted to cooperate with the said ratchet so that the reciprocating movement of the said gears causes the said feed roller to be intermittently turned in the same direction.

7. A device according to claim 6 in which the carriage and the frame have cooperating adjustable stop means to limit the reciprocating movement of the roller.

8. A device according to claim 6 including means adapted to adjust the said rack so as to vary the movement of the feed roller.

9. A device according to claim 6 in which the frame has a pair of adjustable shutters and including means adapted to simultaneously adjust the said rack and the said shutters.

10. In a camera attachment and sub-combination of a frame located at the rear of a camera, a sliding carriage mounted upon the said frame, said carriage having a support for a roll of film located thereon, said carriage also having a take-up roller for the said film located thereon, a shaft connected to the take-up roller so as to turn in unison therewith, a spring barrel upon the said carriage and connected to the said take-up roller so as to turn the said take-up roller and maintain it under suitable tension, a spring connected to the said spring barrel, a shaft connected to the said spring and co-acting means located on the frame and on the said carriage and adapted to turn the last mentioned shaft when the carriage is actuated to tense the said spring when the carriage is actuated.

11. A device according to claim 10 in which the said co-acting means comprise a rack mounted on the frame, a gear adapted to mesh with the said rack and freely mounted upon the last mentioned shaft, said last mentioned shaft also having a ratchet connected thereto, said gear having a pawl connected thereto which is adapted to co-act with the said ratchet.

12. In a camera attachment, a frame located at the rear of the camera, a slidable carriage located in said frame, film supporting means and film feeding means located on said carriage and movable in unison therewith, and actuating means for said feeding means, said actuating means being located on the said frame and on the said carriage and being operable by a relative sliding movement between said carriage and said frame.

13. In a camera attachment, a frame located at the rear of the camera, a slidable carriage located in said frame, film supporting means and film feeding means located on said carriage and movable in unison therewith, and actuating means for said feeding means, said actuating means being located on the said frame and on the said carriage and being operable by a relative sliding movement between said carriage and said frame, and means adapted to regulate the length of said relative sliding movement.

In testimony whereof I affix my signature.

SAMUEL HERSHBERG.